US012631594B2

(12) United States Patent
Fukui et al.

(10) Patent No.: US 12,631,594 B2
(45) Date of Patent: May 19, 2026

(54) DETECTION DEVICE

(71) Applicant: TDK Corporation, Tokyo (JP)

(72) Inventors: Takato Fukui, Tokyo (JP); Taiju Akushichi, Tokyo (JP)

(73) Assignee: TDK Corporation, Tokyo (JP)

( * ) Notice: Subject to any disclaimer, the term of this patent is extended or adjusted under 35 U.S.C. 154(b) by 174 days.

(21) Appl. No.: 18/548,297

(22) PCT Filed: Feb. 22, 2022

(86) PCT No.: PCT/JP2022/007191
§ 371 (c)(1),
(2) Date: Aug. 29, 2023

(87) PCT Pub. No.: WO2022/185998
PCT Pub. Date: Sep. 9, 2022

(65) Prior Publication Data
US 2024/0142404 A1 May 2, 2024

(30) Foreign Application Priority Data

Mar. 4, 2021 (JP) ................................. 2021-034533

(51) Int. Cl.
*G01N 27/82* (2006.01)
(52) U.S. Cl.
CPC .................................... *G01N 27/82* (2013.01)
(58) Field of Classification Search
None
See application file for complete search history.

(56) References Cited

U.S. PATENT DOCUMENTS 5,134,368 A * 7/1992 Otaka .................... G01N 27/72
324/241
6,331,744 B1 * 12/2001 Chen ...................... H02K 35/02
310/46
(Continued)

FOREIGN PATENT DOCUMENTS

CN 210155073 U 3/2020
JP 2000-321249 A 11/2000
(Continued)

OTHER PUBLICATIONS

Ozaki Toru et al.; Detector for Non-Destructive Examination Employing Alternating Field; Publication Date: Oct. 7, 2013; Dainichi Kikai Kogyo KK; JP 2013205024 A; (Year: 2013).*
(Continued)

*Primary Examiner* — Nasima Monsur
(74) *Attorney, Agent, or Firm* — Rimon P.C.

(57) ABSTRACT
A detection device includes excitation coils each wound such that magnetic flux generated in the inner diameter area thereof flows out from one opening end toward the other opening end, magnetic members that induce magnetic flux from an opening end of one excitation coil to an opening end of the other excitation coil, and a magnetic detection part that detects magnetic flux flowing through the magnetic members. In this detection device, magnetic flux flowing out from an opening end of the other excitation coil to an opening end of the one excitation coil is applied to an object to be inspected to thereby detect the physical property of the object to be inspected. The excitation coils that generate magnetic fluxes flowing in mutually reverse directions are used, so that magnetic flux can be concentrated within a relatively narrow area of the object A to be inspected.

11 Claims, 11 Drawing Sheets

(56)     References Cited

U.S. PATENT DOCUMENTS

| 2013/0049751 A1* | 2/2013 | Hamberger | .......... | G01R 33/072 |
| | | | | 324/253 |
| 2018/0313907 A1* | 11/2018 | Fukui | .................... | G01R 33/09 |
| 2019/0376785 A1* | 12/2019 | Shen | .................... | G01N 29/043 |

FOREIGN PATENT DOCUMENTS

| JP | 6610178 B2 | 11/2019 |
| KR | 20140019160 A | 2/2014 |

OTHER PUBLICATIONS

Extended European Search Report dated Jan. 17, 2025, issued in corresponding European Patent Application No. 22763054.8, 8 pages.
International Search Report issued in corresponding International Patent Application No. PCT/JP2022/007191, dated May 10, 2022, with English translation.

* cited by examiner

4

5

7

20B

20A

10B

32

10A

60

31 z
y
x

DETECTION DEVICE

CROSS REFERENCE TO RELATED APPLICATIONS

This application is the U.S. National Phase under 35 U.S.C. § 371 of International Application No. PCT/JP2022/007191, filed on Feb. 22, 2022, which claims the benefit of Japanese Patent Application No. 2021-034533, filed on Mar. 4, 2021, the entire contents of each are hereby incorporated by reference.

TECHNICAL FIELD

The present invention relates to a detection device and, more particularly, to a detection device that applies magnetic flux to an object to be inspected to detect a physical property.

BACKGROUND ART

For detecting the physical property of an object to be inspected, it can be considered to apply magnetic flux to an object to be inspected to detect a change in the magnetic flux. A change in magnetic flux can be detected by using a magnetic sensor described in Patent Document 1, for example.

CITATION LIST

Patent Document

[Patent Document 1] Japanese Patent No. 6,610,178

DISCLOSURE OF THE INVENTION

Problem to be Solved by the Invention

However, the magnetic sensor described in Patent Document 1 has sensitivity to magnetic flux over a relatively wide range and is thus not suitable for detecting the physical property of an object to be inspected within a narrow area.

It is therefore an object of the present invention to provide a detection device capable of detecting the physical property of an object to be inspected within a relatively narrow area.

Means for Solving the Problem

A detection device according to the present invention includes first and second excitation coils each wound such that magnetic flux generated in the inner diameter area thereof flows out from one opening end thereof toward the other opening end, a magnetic member that induces magnetic flux from the other opening end of the second excitation coil to the one opening end of the first excitation coil, and a magnetic detection part that detects magnetic flux flowing through the magnetic member. Magnetic flux flowing out from the other opening end of the first excitation coil to the one opening end of the second excitation coil is applied to an object to be inspected to detect the physical property of the object to be inspected is detected.

According to the present invention, the first and second excitation coils generating magnetic fluxes flowing in mutually reverse directions are used, so that magnetic flux can be concentrated within a relatively narrow area of the object to be inspected. This allows detection of the physical property of the object to be inspected within a relatively narrow area.

In the present invention, the first and second excitation coils may be connected in series to each other and whereby the same excitation current may flow in the first and second excitation coils. This simplifies a circuit configuration.

In the present invention, the magnetic member may include a first magnetic member magnetically coupled to the first excitation coil and a second magnetic member magnetically coupled to the second excitation coil, and the magnetic detection part may detect magnetic flux flowing between the first and second magnetic members. This allows the magnetic detection part to detect a change in the magnetic flux with high sensitivity. In this case, a part of the first magnetic member may be positioned in the inner diameter area of the first excitation coil, and a part of the second magnetic member may be positioned in the inner diameter area of the second excitation coil. This allows further enhancement of detection sensitivity.

In the present invention, the coil axes of the respective first and second excitation coils may be positioned on a first virtual plane, the coil axis of the first excitation coil may further be positioned on a second virtual plane perpendicular to the first virtual plane, the coil axis of the second excitation coil may further be positioned on a third virtual plane perpendicular to the second virtual plane, and the magnetic detection part may be positioned between the second and third virtual planes. This allows the magnetic detection part to detect a change in magnetic flux with high sensitivity.

The detection device according to the present invention may further include an excitation circuit for making an excitation current flow through the first and second excitation coils based on a search signal having a predetermined frequency, a high-pass filter for removing a low frequency component from an output signal of the magnetic detection part, and a detection circuit for detecting an output signal of the high-pass filter based on the search signal. This can eliminate the influence of a magnetic field emitted from the object to be inspected or an environmental magnetic field.

Advantageous Effects of the Invention

As described above, according to the present invention, there can be provided a detection device capable of detecting the physical property of an object to be inspected within a relatively narrow area.

BRIEF DESCRIPTION OF THE DRAWINGS

FIG. 1 is a schematic view for explaining the structure of a detection device 1 according to a first embodiment of the present invention, where

MODE FOR CARRYING OUT THE INVENTION

Hereinafter, preferred embodiments of the present invention will be described in detail with reference to the accompanying drawings.

First Embodiment

Figure 1A:
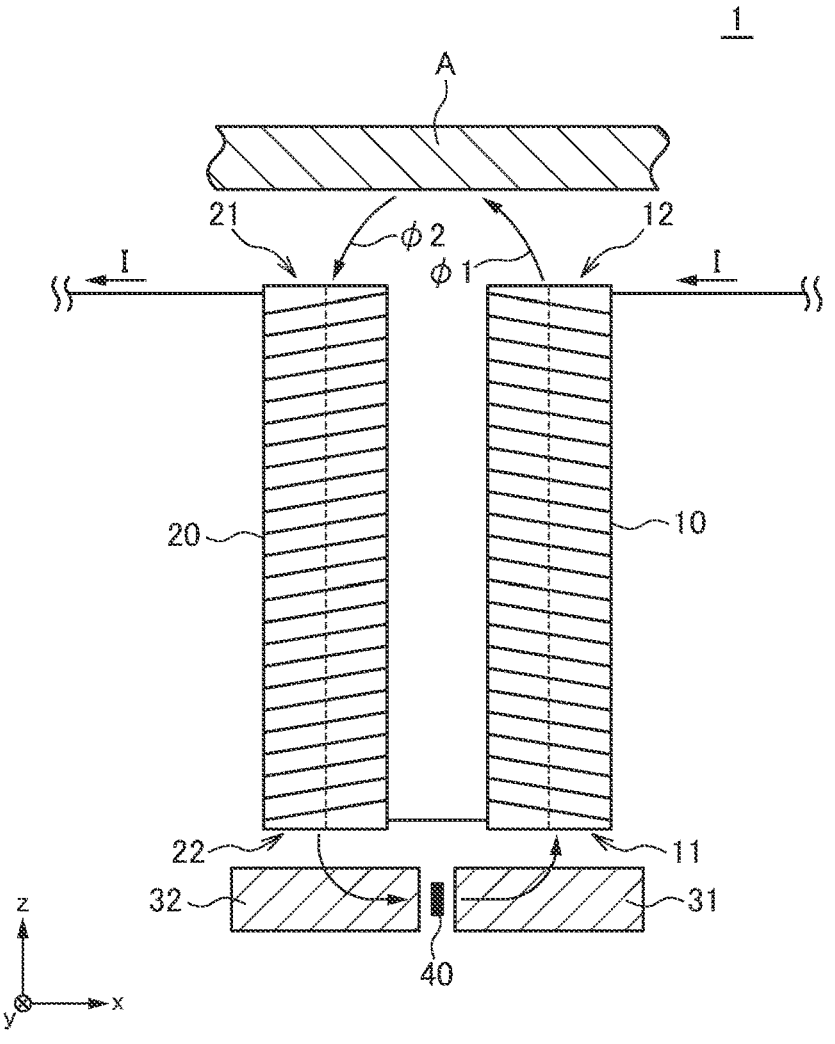
FIG. 1A is an xz side view.
Figure 1B:
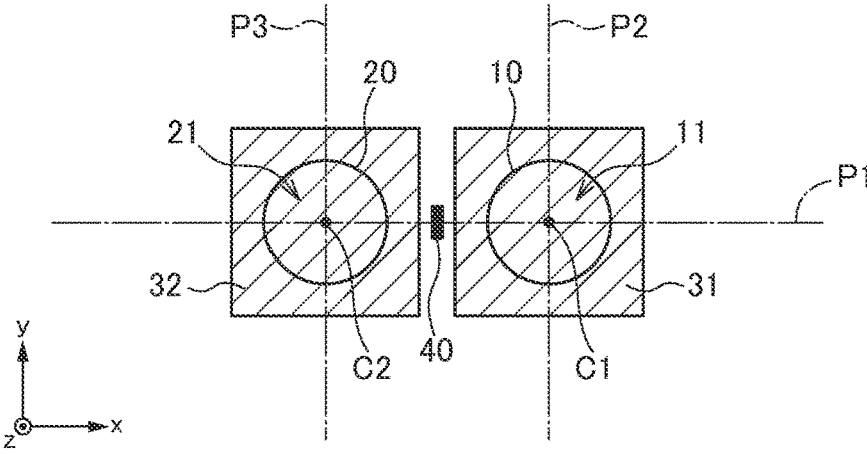
FIG. 1B is an xy plan view.

FIG. 1 is a schematic view for explaining the structure of a detection device 1 according to a first embodiment of the present invention, where FIG. 1A is an xz side view, and FIG. 1B is an xy plan view.

As illustrated in FIGS. 1A and 1B, the detection device 1 according to the first embodiment is configured to detect the physical property of an object A to be inspected and includes excitation coils 10 and 20 whose axial direction is the z-direction, magnetic members 31 and 32 disposed respectively at positions overlapping the coil axes of the respective excitation coils 10 and 20, and a magnetic detection part 40 disposed between the magnetic members 31 and 32. The excitation coils 10 and are connected in series to each other and are wound in mutually reverse directions. Thus, when an excitation current I is made to flow through the excitation coils 10 and 20, a positive z-direction magnetic flux φ1 is generated in the inner diameter area of the excitation coil 10, and a negative z-direction magnetic flux φ2 is generated in the inner diameter area of the excitation coil 20. As a result, in the inner diameter area of the excitation coil 10, the magnetic flux φ1 flows from an opening end 11 of the excitation coil 10 toward an opening end 12 thereof; on the other hand, in the inner diameter area of the excitation coil 20, the magnetic flux φ2 flows from an opening end 21 of the excitation coil 20 toward an opening end 22 thereof.

Since the excitation coils 10 and 20 are disposed close to each other in the x-direction, the magnetic flux flows through a relatively narrow space from the opening end 12 of the excitation coil 10 to the opening end 21 of the excitation coil 20. Similarly, the magnetic flux flows through a relatively narrow space from the opening end 22 of the excitation coil 20 to the opening end 11 of the excitation coil 10.

The magnetic members 31 and 32 are made of a high permeability material such as ferrite. As illustrated in FIGS. 1A and 1B, the magnetic members 31 and 32 are disposed respectively at positions overlapping the coil axes of the respective excitation coils 10 and 20, so that the excitation coil 10 and magnetic member 31 are magnetically coupled to each other, and the excitation coil 20 and magnetic member 32 are magnetically coupled to each other. Thus, the magnetic flux emerging from the opening end 22 of the excitation coil 20 flows to the opening end 11 of the excitation coil 10 while being induced by the magnetic members 31 and 32. Since the magnetic detection part 40 is disposed between the magnetic members 31 and 32, the magnetic flux flowing between the magnetic members 31 and 32 is detected by the magnetic detection part 40.

The magnetic detection part 40 is not particularly limited in position as long as it can detect the magnetic flux flowing between the magnetic members 31 and 32; however, as illustrated in FIG. 1B, assuming that the coil axes of the respective excitation coils 10 and 20 are defined as C1 and C2, that a virtual plane in which both the coil axes C1 and C2 are present is defined as P1, that a virtual plane in which the coil axis C1 is present and which is perpendicular to the virtual plane P1 is defined as P2, and that a virtual plane in which the coil axis C2 is present and which is perpendicular to the virtual plane P1 is defined as P3, the magnetic detection part 40 is preferably disposed between the virtual planes P2 and P3. The magnetic detection part 40 disposed to fall within such an area can detect the magnetic flux generated by the excitation coils 10 and 20 with high sensitivity.

The detection device 1 according to the present embodiment can detect the physical property of the object A to be inspected which is disposed at the leading ends of the excitation coils 10 and 20 in the z-direction, that is, in the vicinity of the opening ends 12 and 21 of the respective excitation coils 10 and 20. More specifically, the magnetic flux radiated from the opening end 12 of the excitation coil 10 and absorbed into the opening end 21 of the excitation coil 20 is applied to a predetermined area of the object A to be inspected, and a change in the magnetic flux caused by the applied magnetic flux is detected by the magnetic detection part 40, whereby a magnetic member or a flaw present in the predetermined area of the object A to be inspected can be detected.

Figure 2:
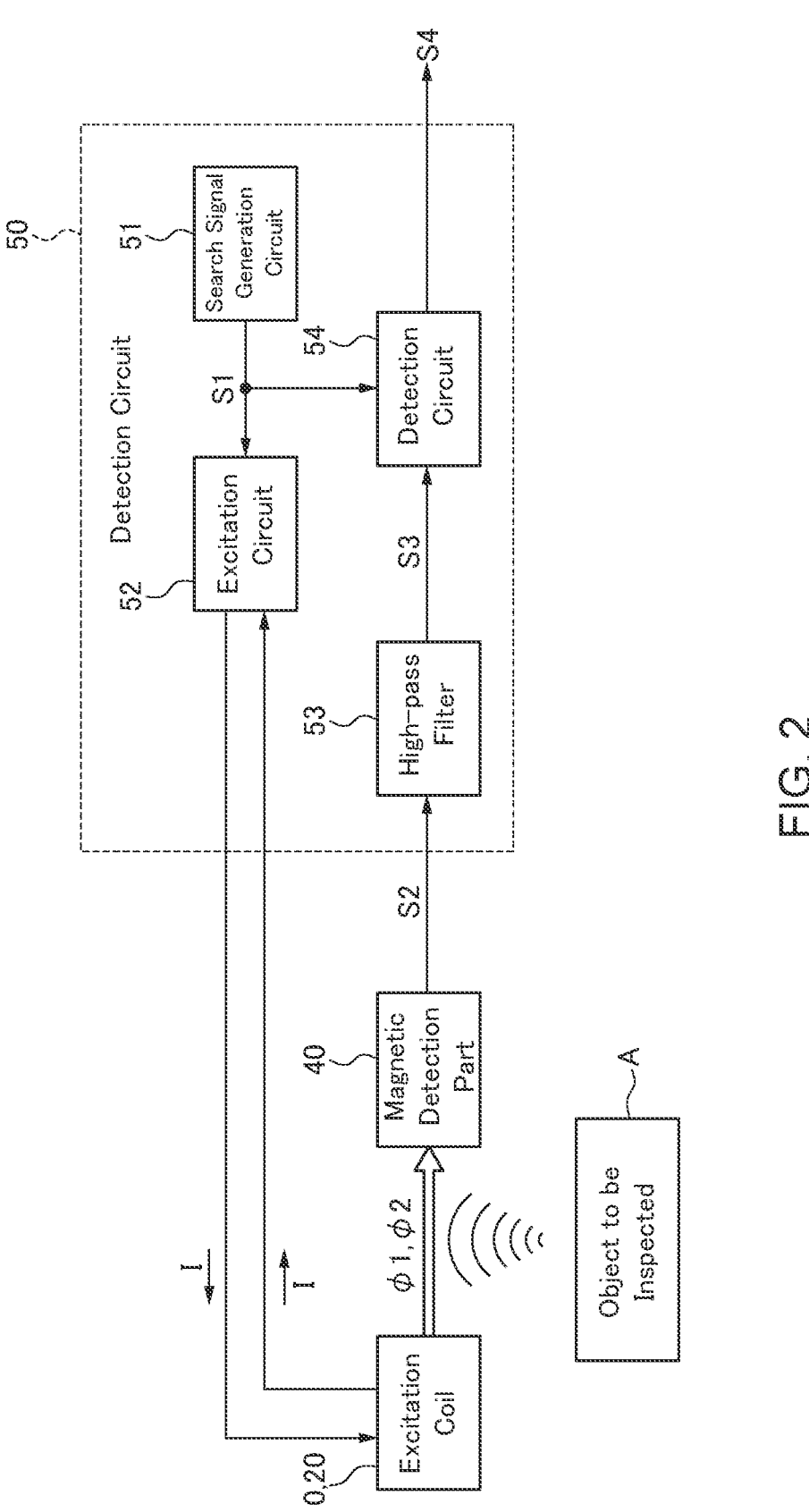
FIG. 2 is a circuit block diagram of the detection device 1.

FIG. 2 is a circuit block diagram of the detection device 1 according to the present embodiment.

As illustrated in FIG. 2, the detection device 1 according to the present embodiment further includes a detection circuit 50. The detection circuit 50 includes a search signal generation circuit 51 for generating a search signal S1 having a predetermined frequency, an excitation circuit 52 for making an excitation current I flow through the excitation coils 10 and 20 based on the search signal S1, a high-pass filter 53 for generating an output signal S3 by removing a low frequency component from an output signal S2 of the magnetic detection part 40, and a detection circuit 54 for detecting the output signal S3 of the high-pass filter 53 based on the search signal S1.

The excitation circuit 52 makes an excitation current I having the same frequency as the search signal S1 having a predetermined frequency flow through the excitation coils 10 and 20. The magnetic fluxes φ1 and φ2 thus generated are detected by the magnetic detection part 40, and an output signal S2 corresponding to the direction and strength of the magnetic flux is generated. At this time, when a change occurs in the magnetic flux to be applied to the magnetic detection part 40 by bringing the leading ends of the respective excitation coils 10 and 20 in the z-direction close to the object A to be inspected, the output signal S2 changes correspondingly. The occurrence of a change in the magnetic flux to be applied to the magnetic detection part 40 could be attributable to sticking or mixing of magnetic fine powder to or into the object A to be inspected, a change in eddy current due to the presence of a flaw in a metal object as the object A to be inspected, and the like.

The thus generated output signal S2 of the magnetic detection part 40 is subjected to removal of a low-frequency component by the high-pass filter 53, whereby the output signal S3 is generated. It is not essential to use the high-pass filter in the present invention; however, removal of a low-frequency component using the high-pass filter can eliminate the influence of a magnetic field emitted from the object A to be inspected or an environmental magnetic field.

The thus generated output signal S3 is detected by the detection circuit 54, whereby an output signal S4 of a DC level is generated. Thus, by scanning the leading ends of the respective excitation coils 10 and 20 on the surface of the object A to be inspected, it is possible to detect magnetic fine powder or a flaw present in the object A to be inspected based on a change in the level of the output signal S4.

As described above, the detection device 1 according to the present embodiment uses the excitation coils 10 and 20 wound in mutually reverse directions, thereby making it possible to concentrate detection magnetic flux within a relatively narrow area of the object A to be inspected. Thus, the physical property of the object A to be inspected within a relatively narrow area can be detected with high sensitivity.

Second Embodiment

Figure 3:
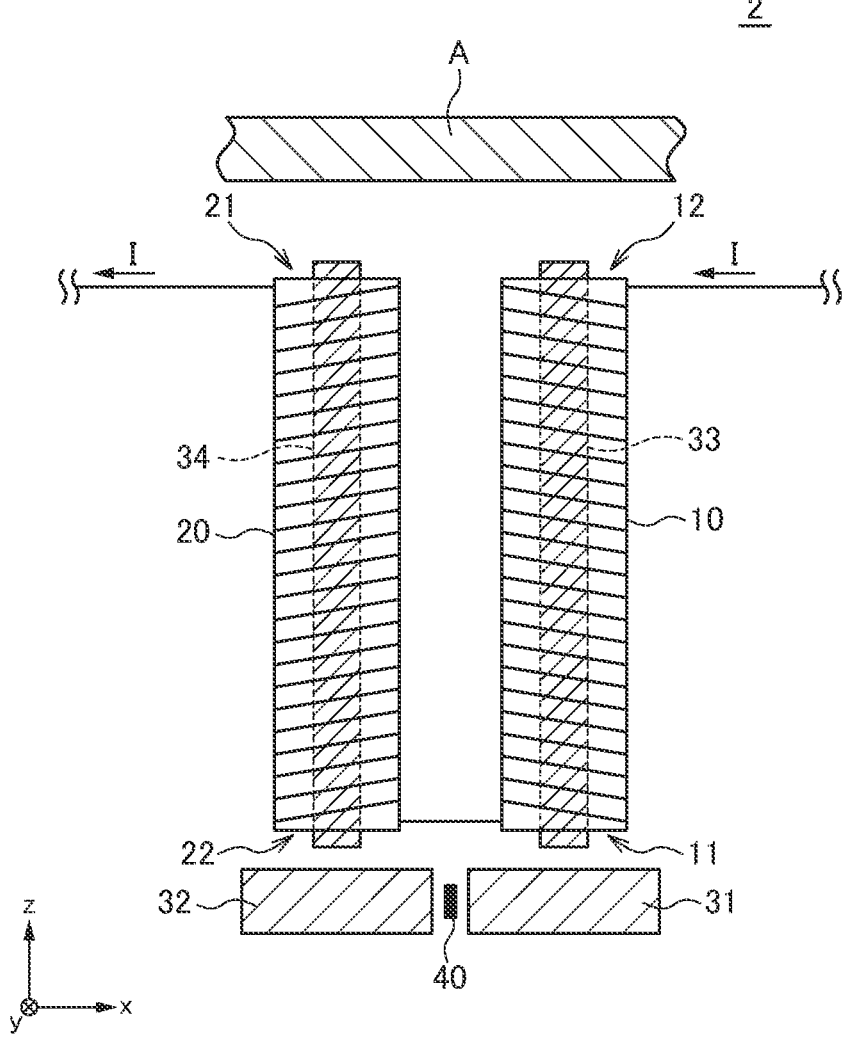
FIG. 3 is a schematic xz side view for explaining the structure of a detection device 2 according to a second embodiment of the present invention.

FIG. 3 is a schematic xz side view for explaining the structure of a detection device 2 according to a second embodiment of the present invention.

As illustrated in FIG. 3, the detection device 2 according to the second embodiment differs from the detection device 1 according to the first embodiment in that magnetic members 33 and 34 are inserted respectively through the inner diameter areas of the excitation coils 10 and 20. Other basic configurations are the same as those of the detection device 1 according to the first embodiment, so the same reference numerals are given to the same elements, and overlapping description will be omitted.

The magnetic member 33 is positioned close to or in contact with the magnetic member 31, whereby magnetic coupling between the magnetic member 31 and the excitation coil 10 is enhanced. Similarly, the magnetic member 34 is positioned close to or in contact with the magnetic member 32, whereby magnetic coupling between the magnetic member 32 and the excitation coil 20 is enhanced. Adding the thus configured magnetic members 33 and 34 allows further enhancement of detection sensitivity.

Third Embodiment

Figure 4:
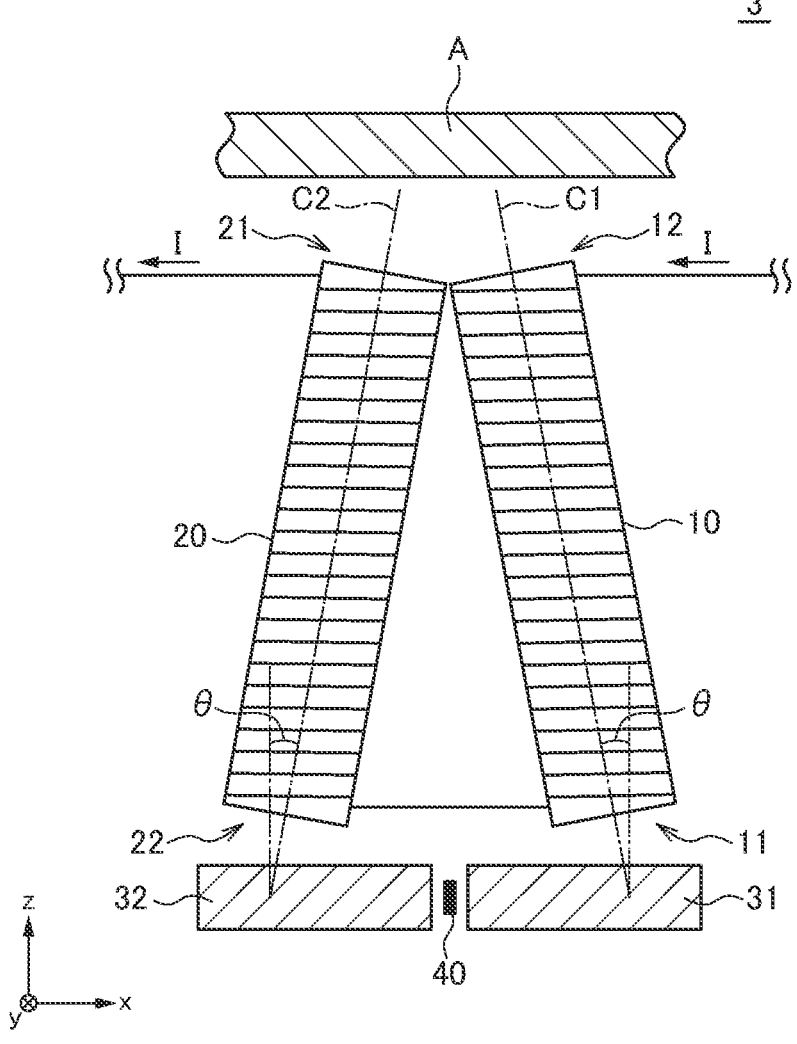
FIG. 4 is a schematic xz side view for explaining the structure of a detection device 3 according to a third embodiment of the present invention.

FIG. 4 is a schematic xz side view for explaining the structure of a detection device 3 according to a third embodiment of the present invention.

As illustrated in FIG. 4, the detection device 3 according to the third embodiment differs from the detection device 1 according to the first embodiment in that the coil axes of the respective excitation coils 10 and 20 have a predetermined inclination with respect to the z-direction. Other basic configurations are the same as those of the detection device 1 according to the first embodiment, so the same reference numerals are given to the same elements, and overlapping description will be omitted.

In the present embodiment, a coil axis C1 of the excitation coil 10 is inclined at an angle θ in the negative x-direction, and a coil axis C2 of the excitation coil 20 is inclined at an angle θ in the positive x-direction. This further suppresses the spread of magnetic flux in between the opening end 12 of the excitation coil 10 and the opening end 21 of the excitation coil 20, thus allowing detection magnetic flux to be concentrated within a narrower area of the object A to be inspected.

Fourth Embodiment

Figure 5:
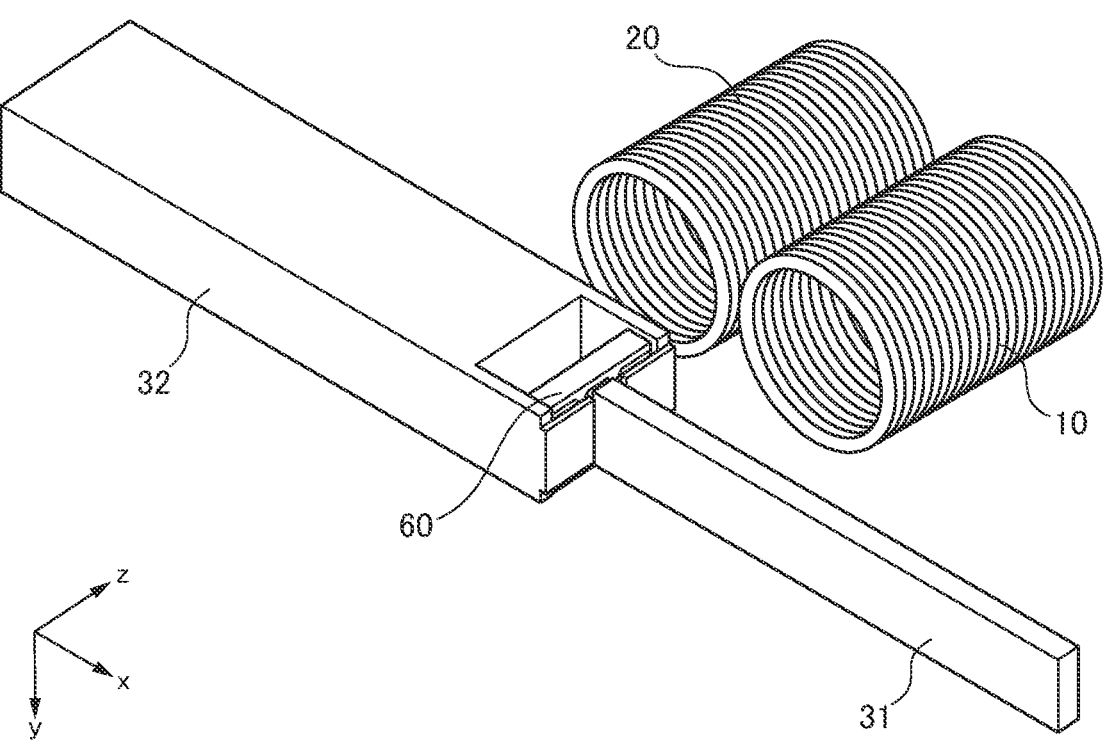
FIG. 5 is a schematic perspective view for explaining the structure of a detection device 4 according to a fourth embodiment of the present invention.

FIG. 5 is a schematic perspective view for explaining the structure of a detection device 4 according to a fourth embodiment of the present invention.

As illustrated in FIG. 5, the detection device 4 according to the fourth embodiment differs from the detection device 1 according to the first embodiment in that a sensor chip 60 is used as the magnetic detection part and that the magnetic members 31 and 32 are disposed so as to cover an element forming surface 61 of the sensor chip 60. Other basic configurations are the same as those of the detection device 1 according to the first embodiment, so the same reference numerals are given to the same elements, and overlapping description will be omitted.

Figure 6:
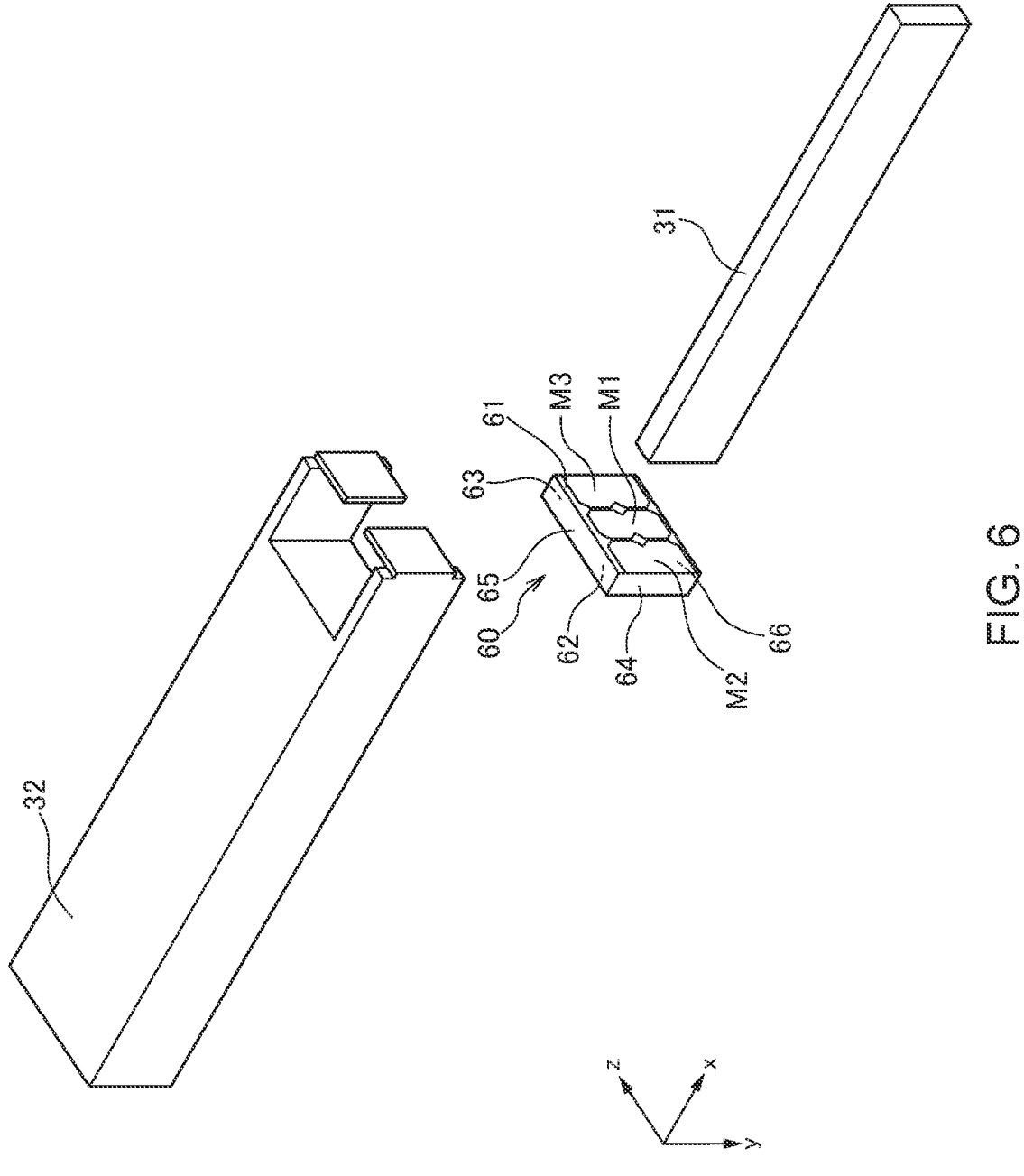
FIG. 6 is a schematic exploded perspective view illustrating a state where the sensor chip 60 and magnetic members 31, 32 are separated from one another.

FIG. 6 is a schematic exploded perspective view illustrating a state where the sensor chip 60 and magnetic members 31, 32 are separated from one another.

As illustrated in FIG. 6, the sensor chip 60 has the element forming surface 61 and a back surface 62 which constitute the yz surface, side surfaces 63 and 64 which constitute the xy surface, and side surfaces 65 and 66 which constitute the xz surface. The element forming surface 61 of the sensor chip 60 has mounted thereon a magnetic sensing element (to be described later) and magnetic layers M1 to M3 (to be described later). The magnetic member 31 has a bar body elongated in the x-direction, and one end thereof in the x-direction is positioned at substantially the center of the element forming surface 61 in the x-direction so as to cover a part of the magnetic layer M1. The magnetic member 32 has a bar body elongated in the x-direction and covers a part of the magnetic layer M2, a part of the magnetic layer M3, and the back and side surfaces 62 and 63 of the sensor chip 60.

Figure 7:
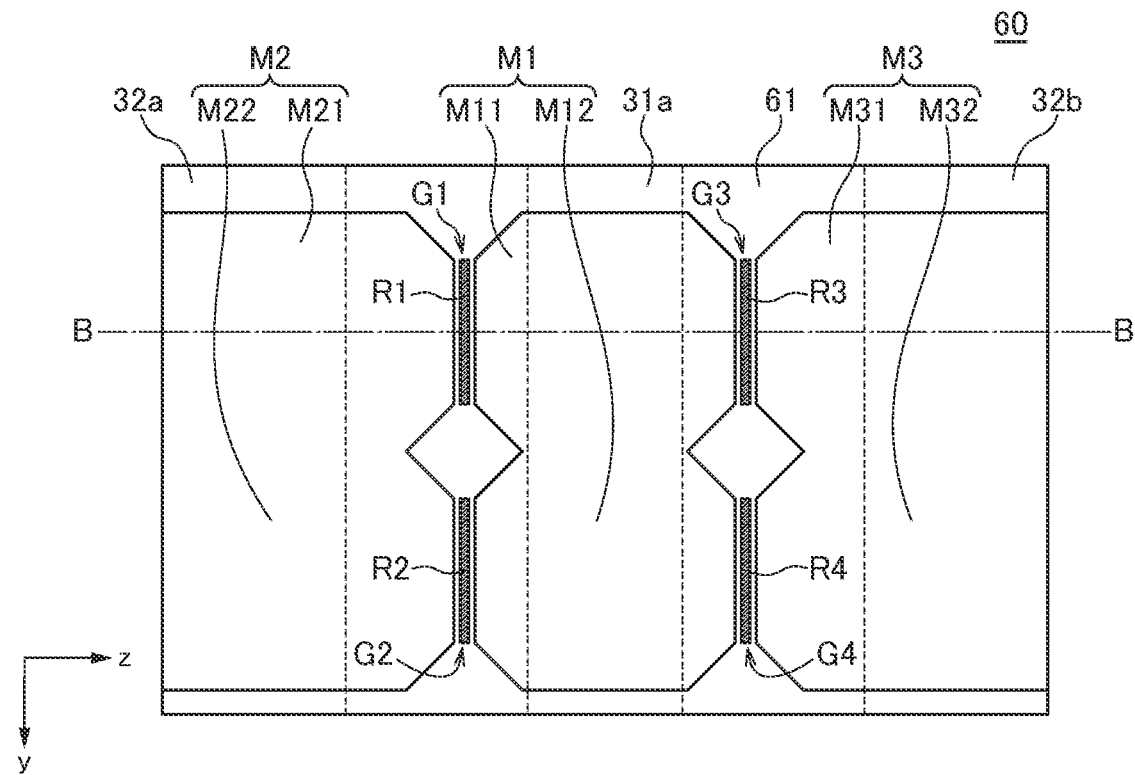
FIG. 7 is a schematic plan view of the sensor chip 60.
Figure 8:
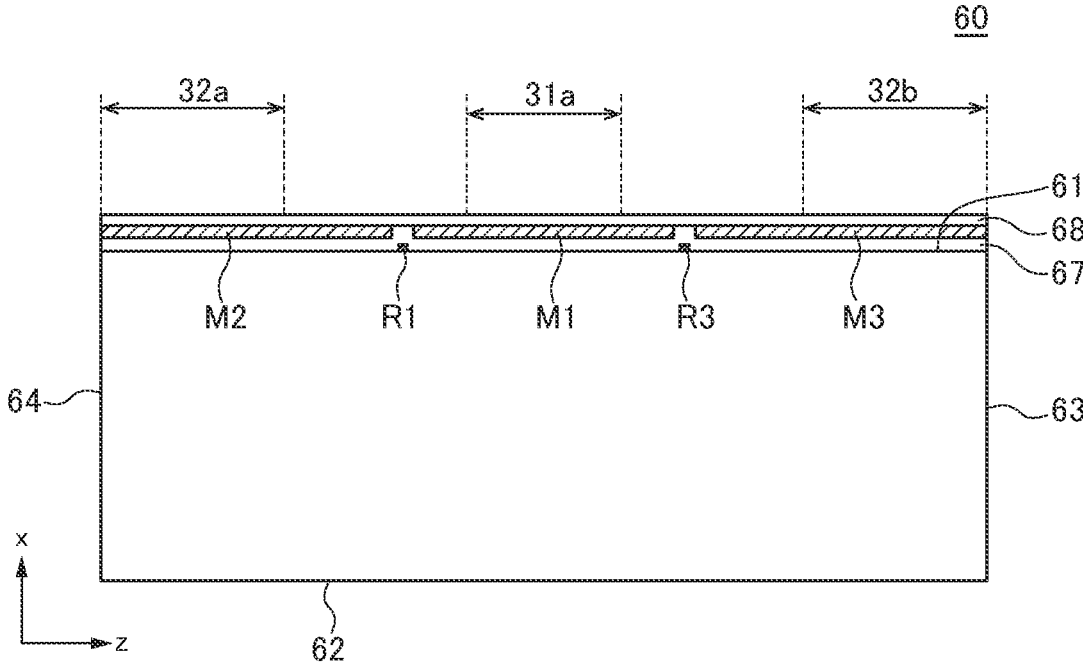
FIG. 8 is a schematic cross-sectional view taken along the line B-B in FIG. 7.

FIG. 7 is a schematic plan view of the sensor chip 60, and FIG. 8 is a schematic cross-sectional view taken along the line B-B in FIG. 7.

As illustrated in FIGS. 7 and 8, four magnetic sensing elements R1 to R4 are formed on the element forming surface 61 of the sensor chip 60. The magnetic sensing elements R1 to R4 are not particularly limited in type as long as they are elements whose electric resistance varies depending on the direction of magnetic flux and may be an MR element, for example. The magnetic sensing elements R1 to R4 have the same fixed magnetization direction (e.g., positive side of the x-direction). The magnetic sensing elements R1 to R4 are covered with an insulating layer 67, and magnetic layers M1 to M3 made of permalloy or the like are formed on the surface of the insulating layer 67. The magnetic layers M1 to M3 are covered with an insulating layer 68. Assuming that parts of the magnetic layers M1 to M3 that are positioned on one side (upper side in FIG. 7) in the y-direction are defined as magnetic layers M11, M21, and M31, respectively, and parts of the magnetic layers M1 to M3 that are positioned on the other side (lower side in FIG. 7) in the y-direction are defined as magnetic layers M12, M22, and M32, respectively, the magnetic sensing element R1 is positioned between the magnetic layers M11 and M12 in a plan view (as viewed in the x-direction), the magnetic sensing element R2 is positioned between the magnetic layers M12 and M22 in a plan view, the magnetic sensing element R3 is positioned between the magnetic layers M11 and M31 in a plan view, and the magnetic sensing element R4 is positioned between the magnetic layers M12 and M32 in a plan view. Thus, magnetic fields passing through magnetic gaps G1 to G4 are applied respectively to the magnetic sensing elements R1 to R4. The direction of the magnetic fields to be applied to the magnetic sensing elements R1 and R2 and the direction of the magnetic fields to be applied to the magnetic sensing elements R3 and R4 differ from each other by 180°, so that when the magnetic sensing elements R1 to R4 are bridge-connected, the direction and strength of magnetic flux to be applied thereto through the magnetic member 31 can be detected.

However, in the present invention, it is not essential that the magnetic sensing elements R1 to R4 are each disposed between two magnetic layers but is sufficient if they are each disposed in the vicinity of each of the magnetic gaps G1 to G4 formed by two magnetic layers, i.e., on a magnetic path formed by each of the magnetic gaps G1 to G4. Further, the width of each of the magnetic gaps G1 to G4 need not necessarily be larger but may be smaller than the width of each of the magnetic sensing elements R1 to R4.

In FIGS. 7 and 8, a reference sign 31a denotes an area covered with the magnetic member 31, and reference signs 32a and 32b denote areas each covered with the magnetic member 32. As illustrated in FIGS. 7 and 8, the magnetic member 31 covers the magnetic layer M1, and the magnetic member 32 covers the magnetic layers M2 and M3.

With such a configuration as described above, the excitation coils 10 and 20 are magnetically coupled respectively to the magnetic members 31 and 32, so that magnetic fine powder or a flaw present in the object A to be inspected can be detected with high sensitivity.

Fifth Embodiment

Figure 9:
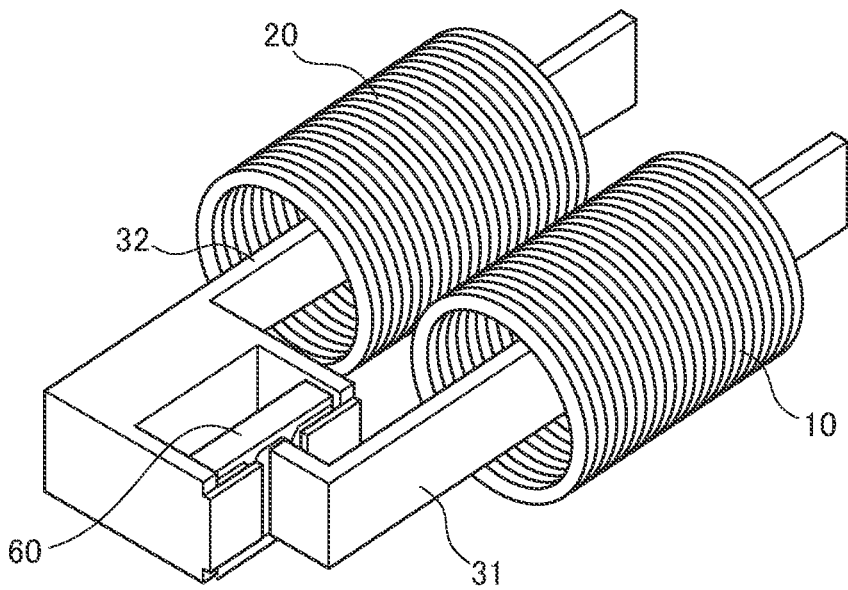
FIG. 9 is a schematic perspective view for explaining the structure of a detection device 5 according to a fifth embodiment of the present invention.
Figure 9:
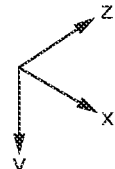

FIG. 9 is a schematic perspective view for explaining the structure of a detection device 5 according to a fifth embodiment of the present invention.

As illustrated in FIG. 9, the detection device 5 according to the fifth embodiment differs from the detection device 4 according to the fourth embodiment in that the magnetic members 31 and 32 are partly bent in the z-direction and inserted through the inner diameter areas of the respective excitation coils 10 and 20. Other basic configurations are the same as those of the detection device 4 according to the fourth embodiment, so the same reference numerals are given to the same elements, and overlapping description will be omitted.

By thus partly inserting the magnetic members 31 and 32 through the inner diameter areas of the respective excitation coils 10 and 20, higher detection sensitivity can be achieved.

Sixth Embodiment

Figure 10:
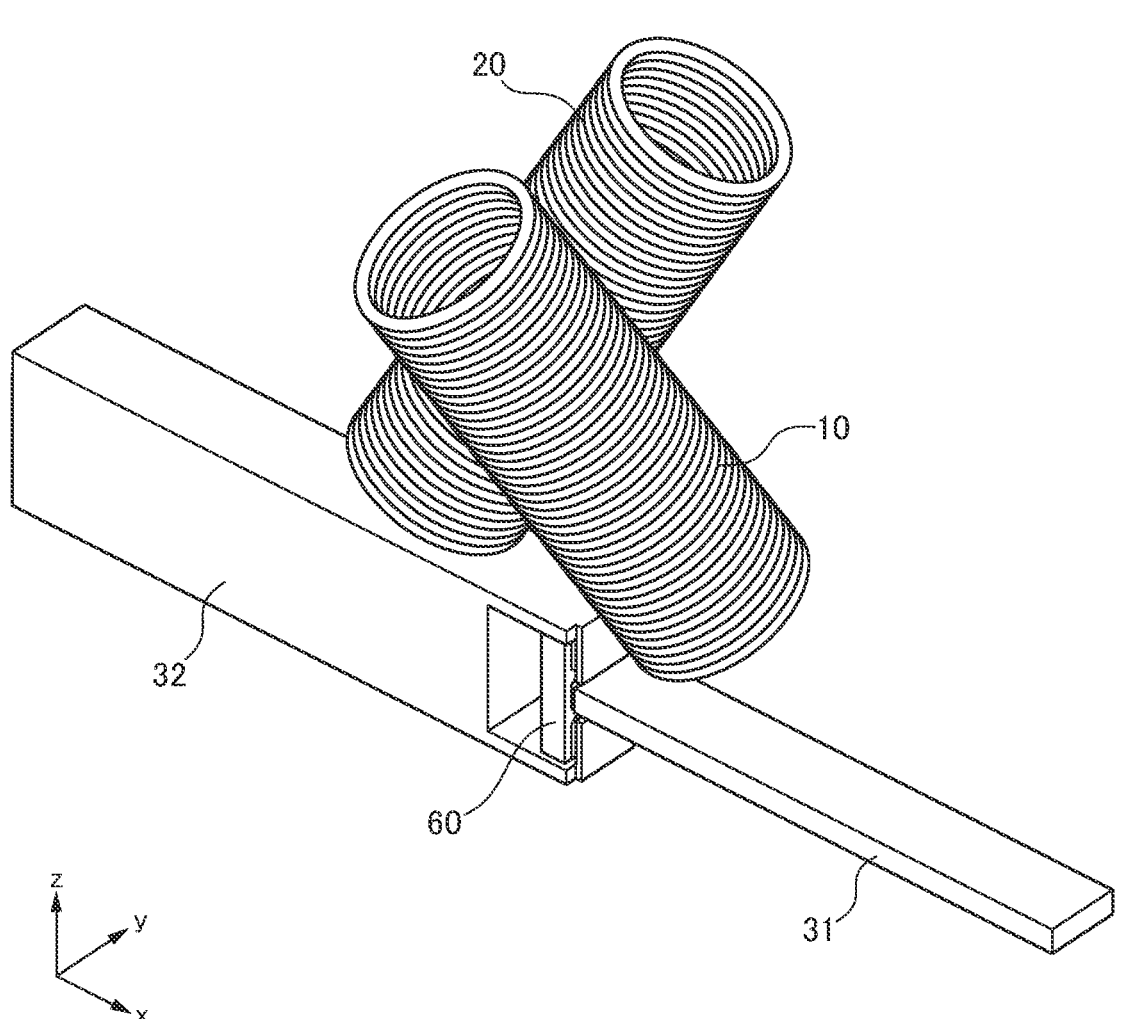
FIG. 10 is a schematic perspective view illustrating the structure of a detection device 6 according to a sixth embodiment of the present invention.

FIG. 10 is a schematic perspective view illustrating the structure of a detection device 6 according to a sixth embodiment of the present invention.

As illustrated in FIG. 10, a detection device 6 according to the sixth embodiment differs from the detection device 4 according to the fourth embodiment in that the coil axes of the respective excitation coils 10 and 20 have a predetermined inclination with respect to the z-direction. Other basic configurations are the same as those of the detection device 4 according to the fourth embodiment, so the same reference numerals are given to the same elements, and overlapping description will be omitted.

By thus inclining the coil axes of the respective excitation coils 10 and 20, the range of magnetic flux to be applied to the object A to be inspected can be adjusted.

Seventh Embodiment

Figure 11:
FIG. 11 is a schematic perspective view for explaining the structure of a detection device 7 according to a seventh embodiment of the present invention.

FIG. 11 is a schematic perspective view for explaining the structure of a detection device 7 according to a seventh embodiment of the present invention.

As illustrated in FIG. 11, the detection device 7 according to the seventh embodiment differs from the detection device 4 according to the fourth embodiment in that four excitation coils 10A, 10B, 20A, and 20B are used. Other basic configurations are the same as those of the detection device 4 according to the fourth embodiment, so the same reference numerals are given to the same elements, and overlapping description will be omitted.

The excitation coils 10A and 10B are wound in mutually reverse directions, and the excitation coils 20A and 20B are wound in mutually reverse directions. The excitation coils 10A and 10B are magnetically coupled to the magnetic member 31, and the excitation coils 20A and 20B are magnetically coupled to the magnetic member 32. By thus using a plurality of the excitation coils 10 and a plurality of excitation coils 20, the range of magnetic flux to be applied to the object A to be inspected can be adjusted.

Eighth Embodiment

Figure 12:
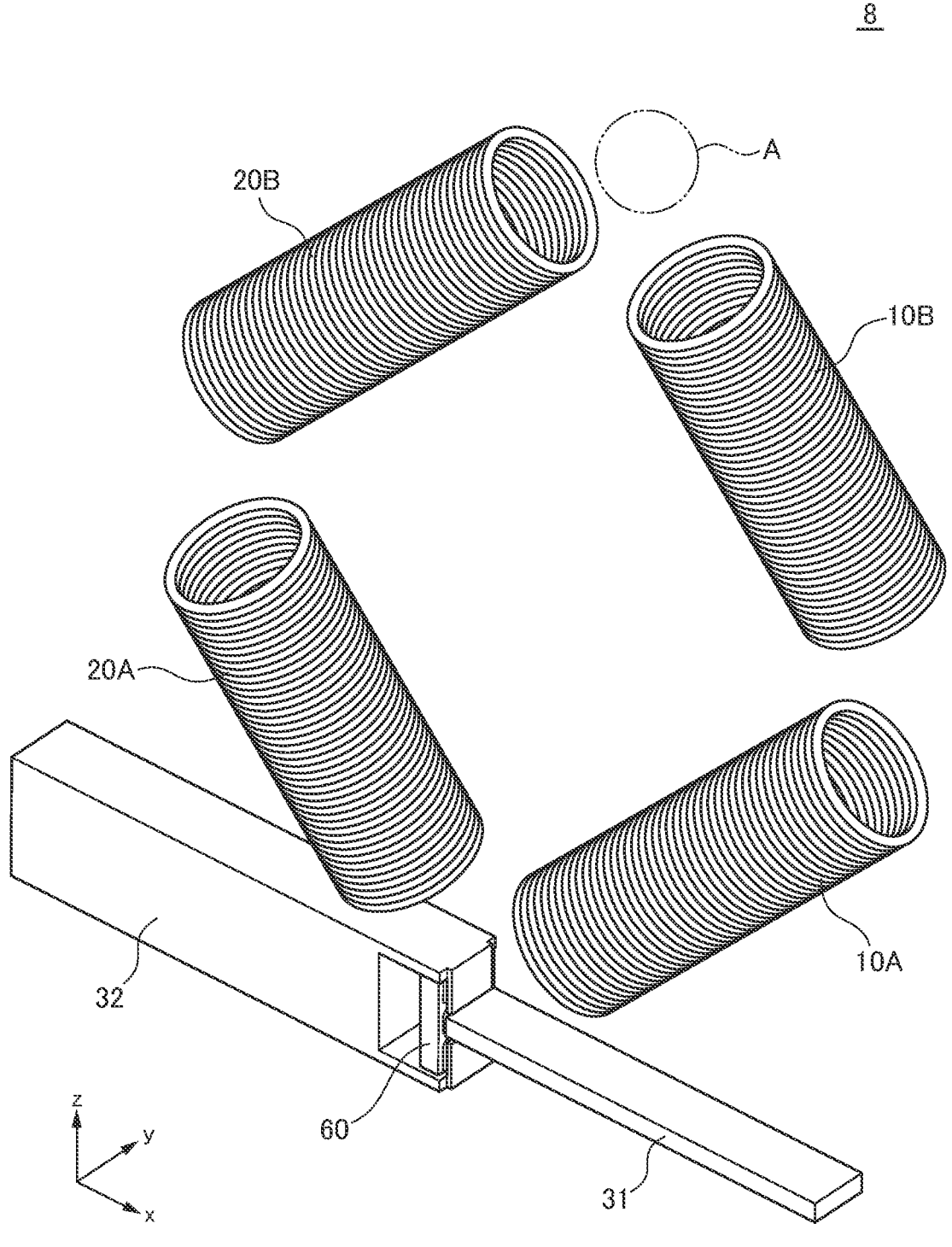
FIG. 12 is a schematic perspective view for explaining the structure of a detection device 8 according to the present invention.

FIG. 12 is a schematic perspective view for explaining the structure of a detection device 8 according to the present invention.

As illustrated in FIG. 12, the detection device 8 according to the eighth embodiment differs from the detection device 7 according to the seventh embodiment in that the four excitation coils 10A, 10B, 20A, and 20B are disposed such that magnetic flux circulates through the excitation coils 10A, 10B, 20B, and 20A in this order (or its reverse direction). Other basic configurations are the same as those of the detection device 7 according to the seventh embodiment, so the same reference numerals are given to the same elements, and overlapping description will be omitted.

In the present embodiment, by disposing the object A to be inspected in an area where the coil axes of the respective excitation coils 10A and 20B cross each other, the physical property of the object A to be inspected can be detected with high sensitivity.

While the preferred embodiment of the present invention has been described, the present invention is not limited to the above embodiment, and various modifications may be made within the scope of the present invention, and all such modifications are included in the present invention.

REFERENCE SIGNS LIST 1-8 detection device
10, 20, 10A, 10B, 20A, 20B excitation coil
11, 12, 21, 22 opening end
31-34 magnetic member
40 magnetic detection part
50 detection circuit
51 search signal generation circuit
52 excitation circuit
53 high-pass filter
54 detection circuit
60 sensor chip
61 element forming surface

62 back surface of sensor chip
63-66 side surface of sensor chip
67, 68 insulating layer
A object to be inspected
C1, C2 coil axis
G1-G4 magnetic gap
I excitation current
M1-M3, M11, M21, M31, M12, M22, M32
P1-P3 virtual plane
R1-R4 magnetic sensing element
S1 search signal
S2-S4 output signal
φ1, φ2 magnetic flux

What is claimed is:

1. A detection device comprising:
a first excitation coil surrounding a first inner diameter area having a first opening end and a second opening end;
a second excitation coil surrounding a second inner diameter area having a third opening end and a fourth opening end;
a first magnetic member having a first section located inside the first inner diameter area, a second section protruding from the first opening end, and a third section protruding from the second opening end;
a second magnetic member having a fourth section located inside the second inner diameter area, a fifth section protruding from the third opening end, and a sixth section protruding from the fourth opening end, wherein the first and second magnetic members are arranged such that a first magnetic gap is formed between the second section of the first magnetic member and the fifth section of the second magnetic member and that a second magnetic gap is formed between the third section of the first magnetic member and the sixth section of the second magnetic member;
an excitation circuit configured to supply an excitation current to the first and second excitation coils such that:
magnetic flux flows from the second section of the first magnetic member through the first section of the first magnetic member to the third section of the first magnetic member,
the magnetic flux flows from the third section of the first magnetic member through the second magnetic gap to the sixth section of the second magnetic member,
the magnetic flux flows from the sixth section of the second magnetic member through the fourth of the second magnetic member to the fifth section of the second magnetic member, and
the magnetic flux flows from the fifth section of the second magnetic member through the first magnetic gap to the second section of the first magnetic member;
a magnetic detection part that detects magnetic flux flowing through the first magnetic gap; and
a third magnetic member magnetically coupled to the second section of the first magnetic member; and
a fourth magnetic member magnetically coupled to the fifth section of the second magnetic member,
wherein the magnetic detection part is configured to detect the magnetic flux flowing through a third magnetic gap formed between the third and fourth magnetic members.

2. The detection device as claimed in claim 1, wherein first and second excitation coils are connected in series to each other and whereby a same excitation current flows in the first and second excitation coils.

3. The detection device as claimed in claim 1,
wherein coil axes of the respective first and second excitation coils are positioned on a first virtual plane,
wherein a coil axis of the first excitation coil is further positioned on a second virtual plane perpendicular to the first virtual plane,
wherein a coil axis of the second excitation coil is further positioned on a third virtual plane perpendicular to the first virtual plane, and
wherein the magnetic detection part is positioned between the second and third virtual planes.

4. The detection device as claimed in claim 1, further comprising:
a high-pass filter for removing a low frequency component from an output signal of the magnetic detection part; and
a detection circuit for detecting an output signal of the high-pass filter based on a search signal having a same frequency as the excitation current.

5. The detection device as claimed in claim 1, wherein the first magnetic gap is smaller than the second magnetic gap.

6. The detection device as claimed in claim 1, wherein the magnetic detection part is constituted of a sensor chip.

7. A detection device comprising:
a first excitation coil surrounding a first inner diameter area having a first opening end and a second opening end;
a second excitation coil surrounding a second inner diameter area having a third opening end and a fourth opening end;
a first magnetic member having a first section located inside the first inner diameter area, a second section protruding from the first opening end, and a third section protruding from the second opening end;
a second magnetic member having a fourth section located inside the second inner diameter area, a fifth section protruding from the third opening end, and a sixth section protruding from the fourth opening end, wherein the first and second magnetic members are arranged such that a first magnetic gap is formed between the second section of the first magnetic member and the fifth section of the second magnetic member and that a second magnetic gap is formed between the third section of the first magnetic member and the sixth section of the second magnetic member;
an excitation circuit configured to supply an excitation current to the first and second excitation coils such that:
magnetic flux flows from the second section of the first magnetic member through the first section of the first magnetic member to the third section of the first magnetic member,
the magnetic flux flows from the third section of the first magnetic member through the second magnetic gap to the sixth section of the second magnetic member,
the magnetic flux flows from the sixth section of the second magnetic member through the fourth of the second magnetic member to the fifth section of the second magnetic member, and
the magnetic flux flows from the fifth section of the second magnetic member through the first magnetic gap to the second section of the first magnetic member;
a magnetic detection part that detects magnetic flux flowing through the first magnetic gap; and

a detection circuit configured to detect a magnetic fine powder or a flaw present in an object to be inspected by a change of an output signal from the magnetic detection part while scanning the third section of the first magnetic member and the sixth section of the second magnetic member on a surface of the object.

8. The detection device as claimed in claim 7, wherein each of the third section of the first magnetic member and the sixth section of the second magnetic member is apart from the object while scanning.

9. A detection device comprising:

a first excitation coil surrounding a first inner diameter area having a first opening end and a second opening end;

a second excitation coil surrounding a second inner diameter area having a third opening end and a fourth opening end;

a first magnetic member having a first section located inside the first inner diameter area, a second section protruding from the first opening end, and a third section protruding from the second opening end;

a second magnetic member having a fourth section located inside the second inner diameter area, a fifth section protruding from the third opening end, and a sixth section protruding from the fourth opening end, wherein the first and second magnetic members are arranged such that a first magnetic gap is formed between the second section of the first magnetic member and the fifth section of the second magnetic member and that a second magnetic gap is formed between the third section of the first magnetic member and the sixth section of the second magnetic member;

an excitation circuit configured to supply an excitation current to the first and second excitation coils such that:

magnetic flux flows from the second section of the first magnetic member through the first section of the first magnetic member to the third section of the first magnetic member, the magnetic flux flows from the third section of the first magnetic member through the second magnetic gap to the sixth section of the second magnetic member, the magnetic flux flows from the sixth section of the second magnetic member through the fourth of the second magnetic member to the fifth section of the second magnetic member, and the magnetic flux flows from the fifth section of the second magnetic member through the first magnetic gap to the second section of the first magnetic member; and a magnetic detection part that detects magnetic flux flowing through the first magnetic gap, wherein each of the second section of the first magnetic member and the fifth section of the second magnetic member covers a sensor chip.

10. The detection device as claimed in claim 9, wherein the sensor chip has a first magnetic layer covered with the second section of the first magnetic member, a second magnetic layer covered with the fifth section of the second magnetic member, and a first magnetic sensing element positioned between the first and second magnetic layers in a plan view.

11. The detection device as claimed in claim 10, wherein the sensor chip further has a third magnetic layer covered with the fifth section of the second magnetic member and a second magnetic sensing element positioned between the first and third magnetic layers in a plan view.

* * * * *